United States Patent
Sulai et al.

(10) Patent No.: US 10,495,887 B1
(45) Date of Patent: *Dec. 3, 2019

(54) MULTIFOCAL SYSTEM WITH POLARIZING ELEMENTS

(71) Applicant: Facebook Technologies, LLC, Menlo Park, CA (US)

(72) Inventors: Yusufu Njoni Bamaxam Sulai, Snohomish, WA (US); Nicholas Daniel Trail, Bothell, WA (US); Wai Sze Tiffany Lam, Vancouver (CA)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,359

(22) Filed: Jul. 16, 2019

Related U.S. Application Data

(63) Continuation of application No. 15/384,745, filed on Dec. 20, 2016, now Pat. No. 10,401,630.

(51) Int. Cl.
   *G02B 27/01* (2006.01)
   *G02F 1/01* (2006.01)
   (Continued)

(52) U.S. Cl.
   CPC ..... *G02B 27/0179* (2013.01); *G02B 27/0172* (2013.01); *G02B 27/286* (2013.01);
   (Continued)

(58) Field of Classification Search
   CPC .. G02F 1/01; G02F 2001/212; G02F 2203/50; G02F 1/0123; G02F 1/225; G02F 1/025; G02F 1/2257; G02F 2203/12; G02F 1/0121; G02F 1/2255; G02F 2203/18; G02F 1/0102; G02F 1/011; G02F 1/015; G02F 1/21; G02F 2203/15; G02F 1/0311; G02F 1/1313; G02F 1/19; G02F 1/365; G02F 2201/122; G02F 2201/126; G02F 2201/16; G02F 2201/307; G02F 2203/21; G02F 2203/56; G02F 1/00; G02F 1/0126; G02F 1/0134; G02F 1/0136; G02F 1/0147; G02F 1/017; G02F 1/065; G02F 1/1326; G02F 1/13306; G02F 1/133362; G02F 1/133371;
   (Continued)

(56) References Cited

U.S. PATENT DOCUMENTS

| | | |
|---|---|---|
| 2013/0033756 A1 | 2/2013 | Spitzer et al. |
| 2018/0101020 A1 | 4/2018 | Gollier et al. |
| 2018/0157053 A1 | 6/2018 | Richards et al. |

*Primary Examiner* — Collin X Beatty
*Assistant Examiner* — Grant A Gagnon
(74) *Attorney, Agent, or Firm* — Fenwick & West LLP

(57) ABSTRACT

A head-mounted display (HMD) includes a multifocal block having one or more possible focal distances and includes a multifocal structure. The multifocal structure has a first focal distance and a second focal distance of the one or more possible focal distances. The multifocal structure includes one or more optical components positioned in series such that light from an electronic display is received and passes through each of the one or more optical components at least once before being output from the multifocal structure. The one or more optical components includes a switchable half waveplate (SHWP). The SHWP has a first state that causes the multifocal structure to output image light at the first focal distance, and a second state that causes the multifocal structure to output the image light at the first focal distance.

20 Claims, 8 Drawing Sheets

(Real World)

(3D Display)

(51) Int. Cl.
  *G02F 1/29* (2006.01)
  *G02B 27/28* (2006.01)
  *G02B 27/00* (2006.01)

(52) U.S. Cl.
  CPC .............. *G02F 1/0136* (2013.01); *G02F 1/29* (2013.01); *G02B 27/0093* (2013.01); *G02B 2027/0185* (2013.01); *G02B 2027/0187* (2013.01); *G02F 2001/294* (2013.01); *G02F 2203/50* (2013.01)

(58) Field of Classification Search
  CPC .............. G02F 1/13342; G02F 1/13363; G02F 1/134309; G02F 1/1347; G02F 1/13471; G02F 1/1393; G02F 1/218; G02F 1/2252; G02F 1/29; G02F 1/292; G02F 1/31; G02F 1/3132; G02F 1/3517; G02F 1/3532; G02F 1/3544; G02F 1/3611; G02F 1/37; G02F 1/383; G02F 2001/215; G02F 2001/294; G02F 2001/354; G02F 2201/17; G02F 2201/30; G02F 2201/305; G02F 2201/38; G02F 2202/06; G02F 2202/10; G02F 2202/105; G02F 2202/16; G02F 2202/20; G02F 2202/30; G02F 2202/32; G02F 2202/40; G02F 2203/06; G02F 2203/13; G02F 2203/20; G02F 2203/24; G02F 2203/25; G02F 2203/26; G02F 2203/585; G02F 2203/70; G02F 2/00; G02F 2/02; G02F 7/00; G02B 26/06; G02B 27/48; G02B 21/0032; G02B 21/0056; G02B 2006/12142; G02B 21/0076; G02B 21/008; G02B 21/32; G02B 27/104; G02B 27/145; G02B 27/283; G02B 5/3083; G02B 6/12007; G02B 13/004; G02B 13/0075; G02B 1/007; G02B 21/0072; G02B 21/02; G02B 21/06; G02B 21/14; G02B 2207/114; G02B 26/00; G02B 26/0808; G02B 26/0841; G02B 27/0025; G02B 27/0031; G02B 27/0068; G02B 27/1033; G02B 27/2214; G02B 27/286; G02B 27/46; G02B 27/50; G02B 3/08; G02B 5/02; G02B 5/1814; G02B 5/1828; G02B 5/189; G02B 5/284; G02B 5/3016; G02B 6/02347; G02B 6/02361; G02B 6/02366; G02B 6/02371; G02B 6/0239; G02B 6/024; G02B 6/12004; G02B 6/122; G02B 6/1223; G02B 6/274; G02B 6/2766; G02B 6/2861; G02B 6/293; G02B 6/2931; G02B 6/29343; G02B 6/29394; G02B 6/30; G02B 6/327; G02B 6/34; G02B 6/35; G02B 6/4213; G02B 7/1805
  USPC .......................................................... 359/279
  See application file for complete search history.

(Real World)

(3D Display)

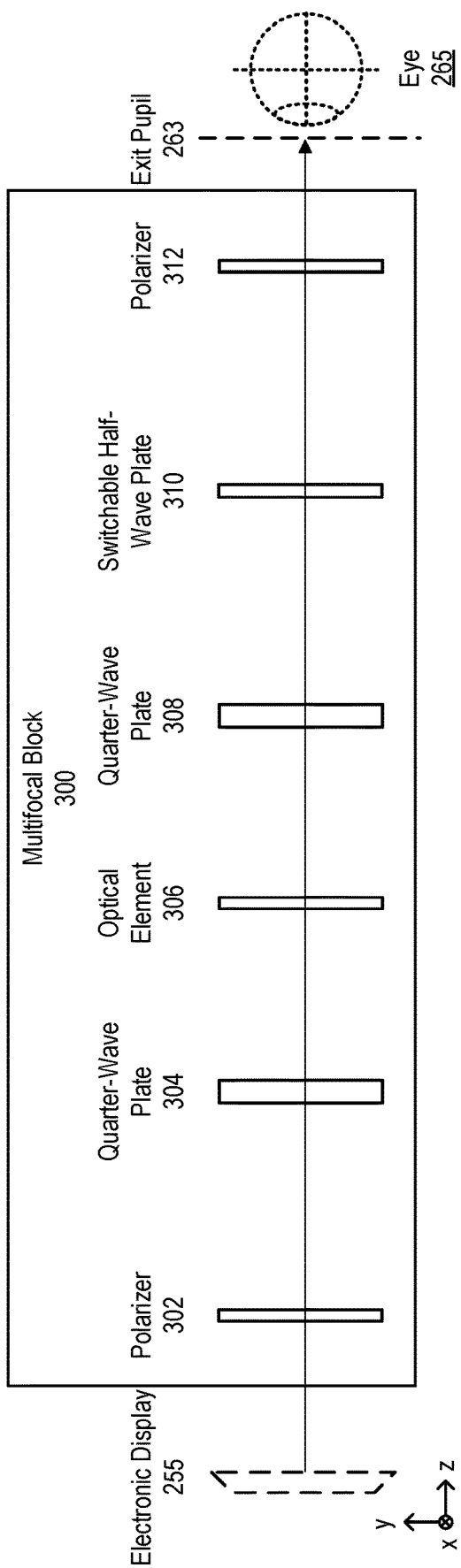
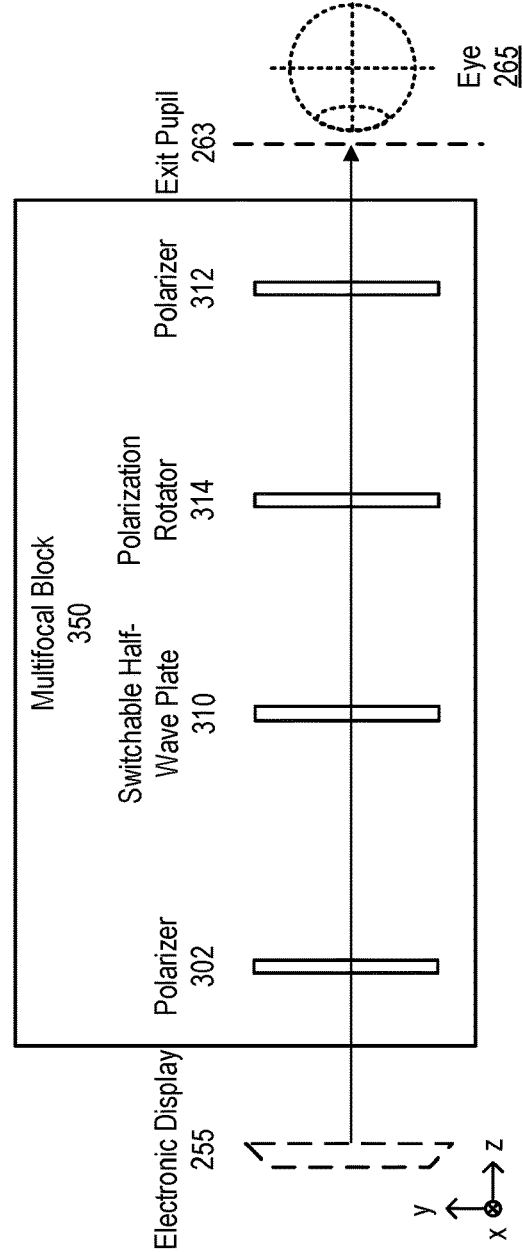

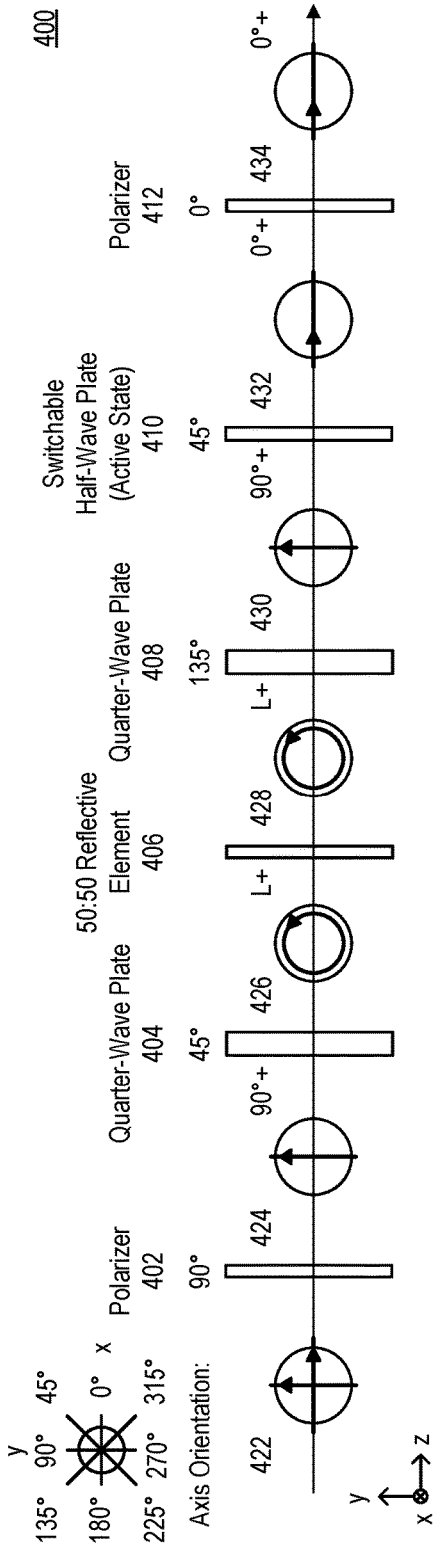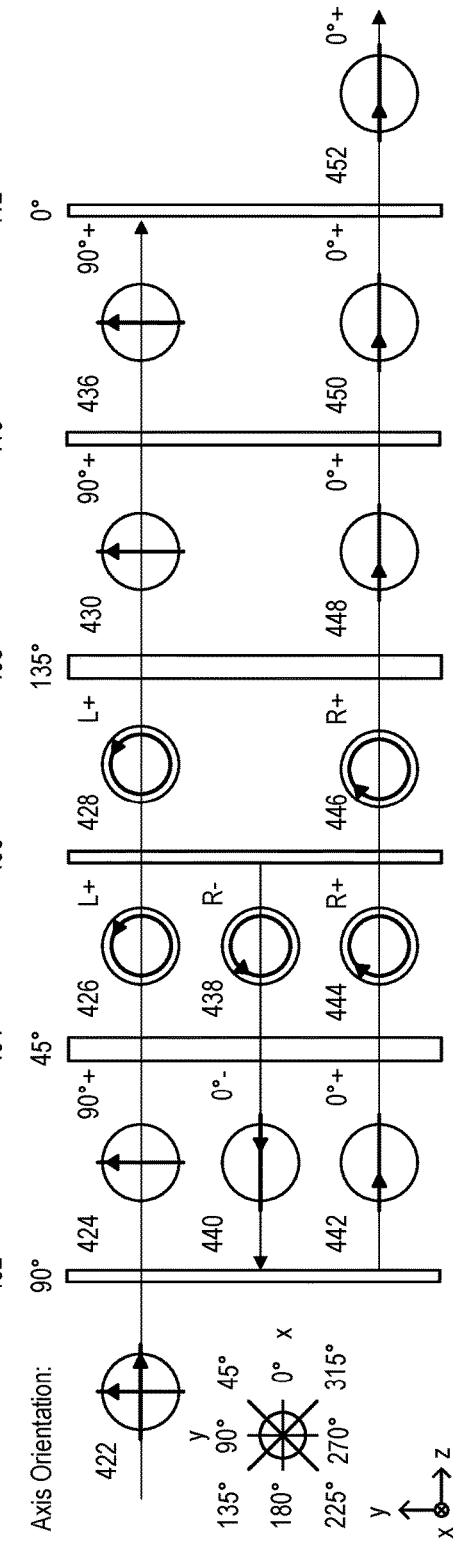
FIG. 4A
FIG. 4B

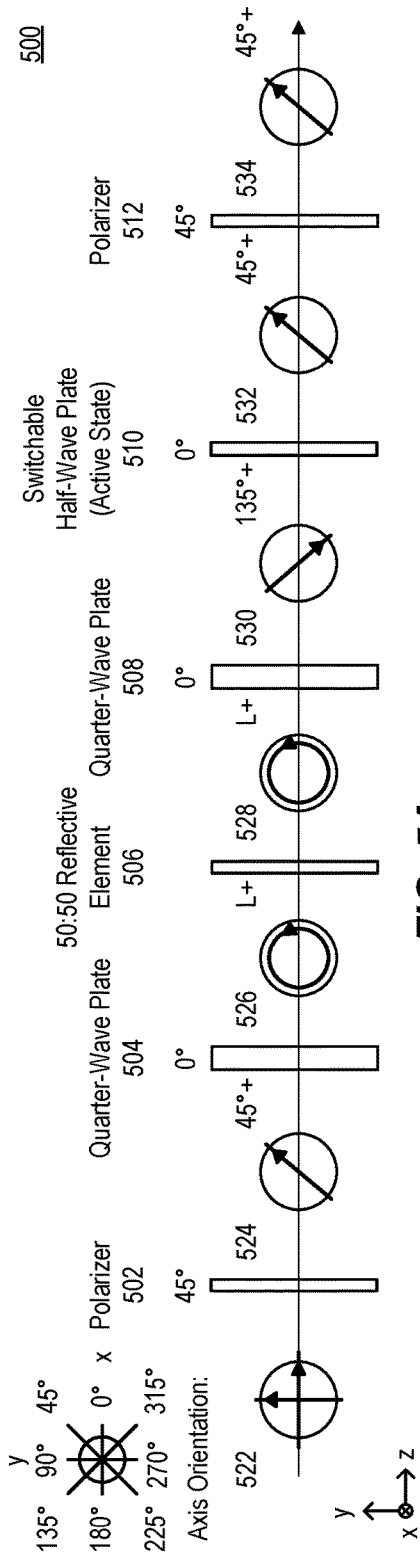
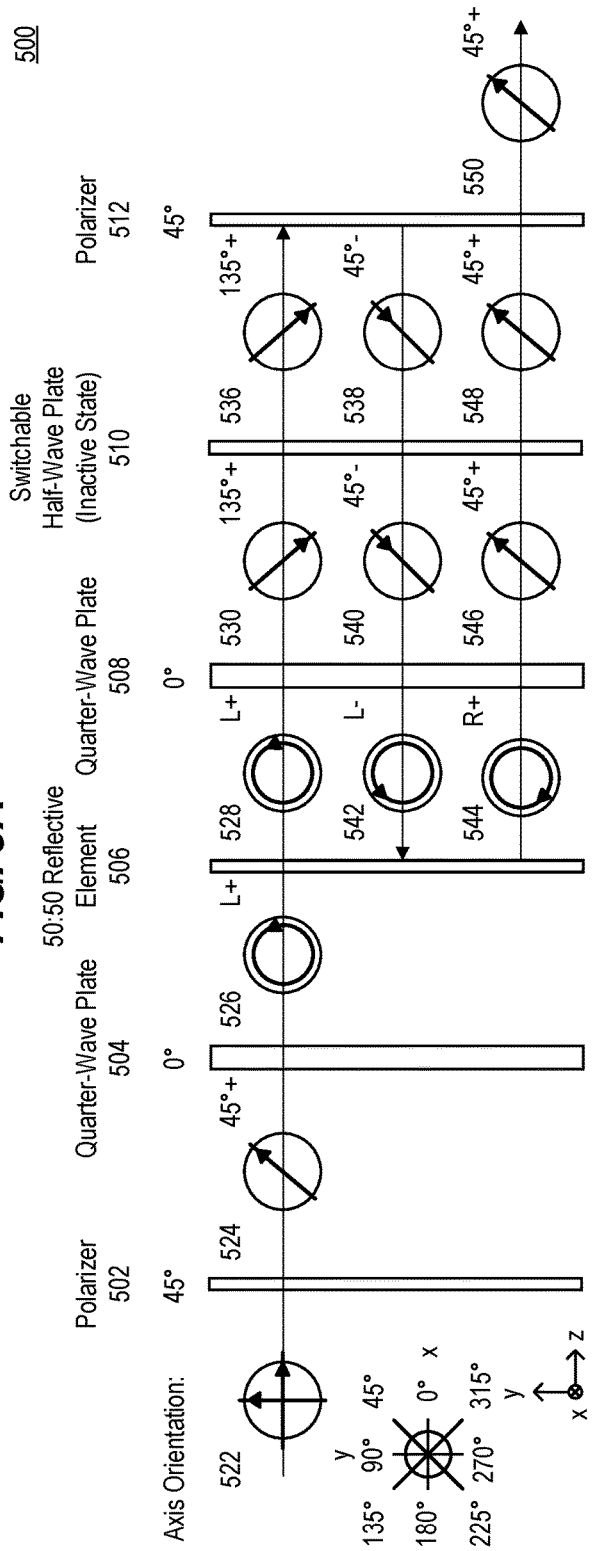
FIG. 5A
FIG. 5B

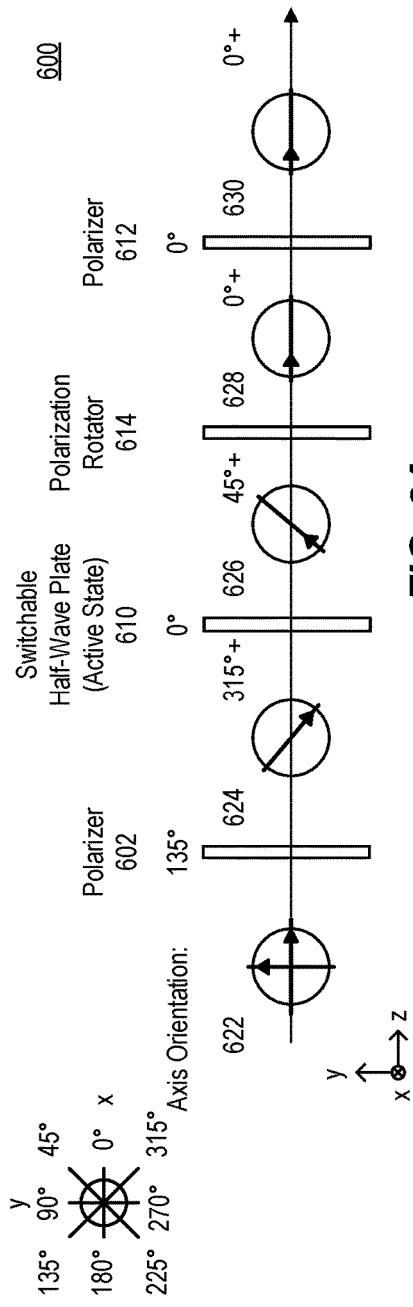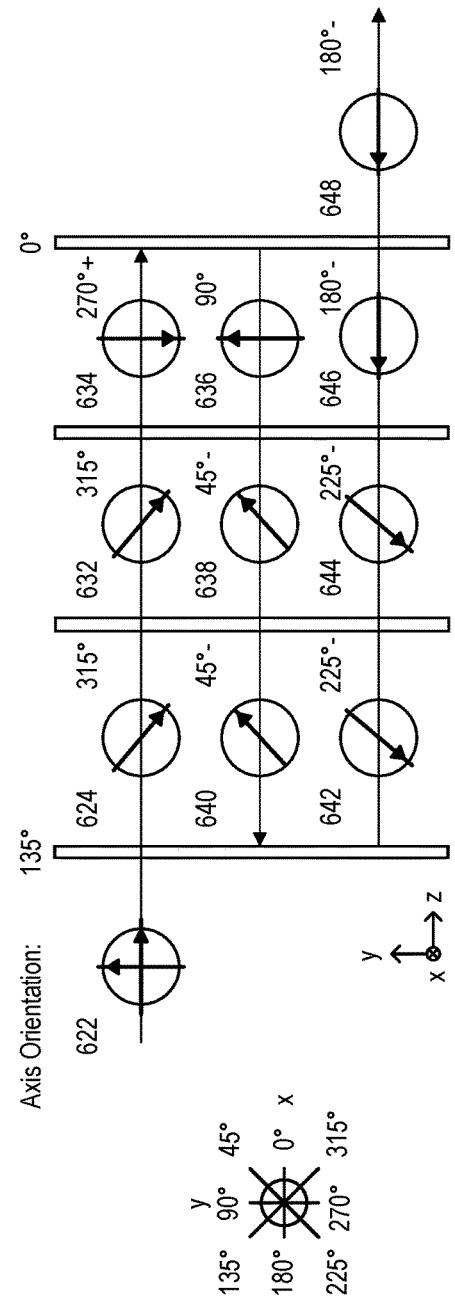

MULTIFOCAL SYSTEM WITH POLARIZING ELEMENTS

CROSS REFERENCE TO RELATED APPLICATIONS

This application is a continuation of co-pending U.S. application Ser. No. 15/384,745, filed Dec. 20, 2016, which is incorporated by reference in its entirety.

BACKGROUND

This invention relates generally to optical systems and specifically relates to a multifocal optical system with polarizing elements.

Head-mounted displays (HMDs) may be used to present augmented and/or virtual information to a user. For example, a virtual reality (VR) headset can be used to simulate virtual environments. Conventionally, a HMD presents stereoscopic images on an electronic display inside the HMD to simulate the illusion of depth. However, conventional HMDs are often unable to compensate for vergence and accommodation conflict when rendering content, which may cause double vision, visual fatigue, and nausea in users.

SUMMARY

A head-mounted display (HMD) includes a multifocal block for presenting images at various focal distances. The multifocal block has one or more possible focal distances and includes at least one multifocal structure. The multifocal structure has a first focal distance and a second focal distance. The multifocal structure includes one or more optical components positioned in series such that light from an electronic display is received and passes through each of the one or more optical components at least once before being output from the multifocal structure. The one or more optical components includes a switchable half waveplate (SHWP). The SHWP has a first state that causes the multifocal structure to output image light at the first focal distance, and a second state that causes the multifocal structure to output the image light at another focal distance.

In some embodiments, the multifocal block includes one or more additional multifocal structures. Each additional multifocal structure is associated with at least two additional focal distances. Accordingly, by cascading multifocal structures in the multifocal block a number of potential focal distances to select from (e.g., via state selection in their SHWPs) is increased.

In some configurations, the HMD further includes an eye tracking system configured to determine eye tracking information for an eye of the user. The multifocal structure is further configured to determine the first focal distance using the eye tracking information, generate focus instructions using the determined first focal distance, and provide the focus instructions to the multifocal block. Responsive to receipt of the focus instructions, the multifocal block configures the multifocal block to output light at the first focal distance.

BRIEF DESCRIPTION OF THE DRAWINGS

FIG. 3A illustrates a multifocal block, according to one embodiment.

FIG. 3B illustrates a multifocal block, according to another embodiment.

FIG. 4A illustrates a first optical path in a multifocal block, according to one embodiment.

FIG. 4B illustrates a second optical path in a multifocal block, according to one embodiment.

FIG. 5A illustrates a first optical path in a multifocal block, according to one embodiment.

FIG. 5B illustrates a second optical path in a multifocal block, according to one embodiment.

FIG. 6A illustrates a first optical path in a multifocal block, according to one embodiment.

FIG. 6B illustrates a second optical path in a multifocal block, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
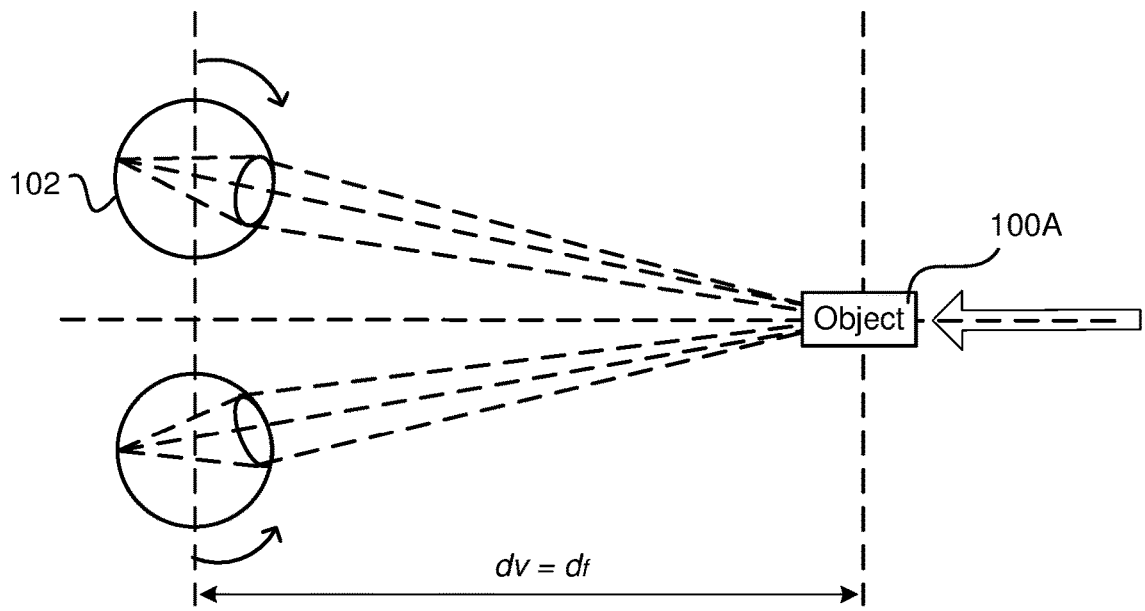
FIG. 1A shows an example of how a human eye experiences vergence and accommodation in a real world, according to one embodiment.

Vergence-accommodation conflict is a problem in many virtual reality systems. Vergence is the simultaneous movement or rotation of both eyes in opposite directions to obtain or maintain a single binocular vision and is connected to accommodation of the eye. Under normal conditions, when human eyes look at a new object at a distance different from an object they had been looking at, the eyes automatically change focus (by changing the shape of their lens) to provide accommodation at the new distance or vergence depth of the new object. FIG. 1A shows an example of how the human eyes experience vergence and accommodation in the real world. In the example of FIG. 1A, the user is looking at a real object 100A (i.e., the user's eyes are verged on the real object 100A and gaze lines from the user's eyes intersect at the real object 100A). As the real object 100A is moved closer to the user, as indicated by the arrow in FIG. 1A, each eye 102 rotates inward (i.e., convergence) to stay verged on the real object 100A. As the real object 100A gets closer, the eye 102 must "accommodate" for the closer distance by changing the shape of its lens to increase focusing power or reduce focal length. Thus, under normal conditions in the real world, the vergence depth (dy) equals the focal point ($d_f$).

Figure 1B:
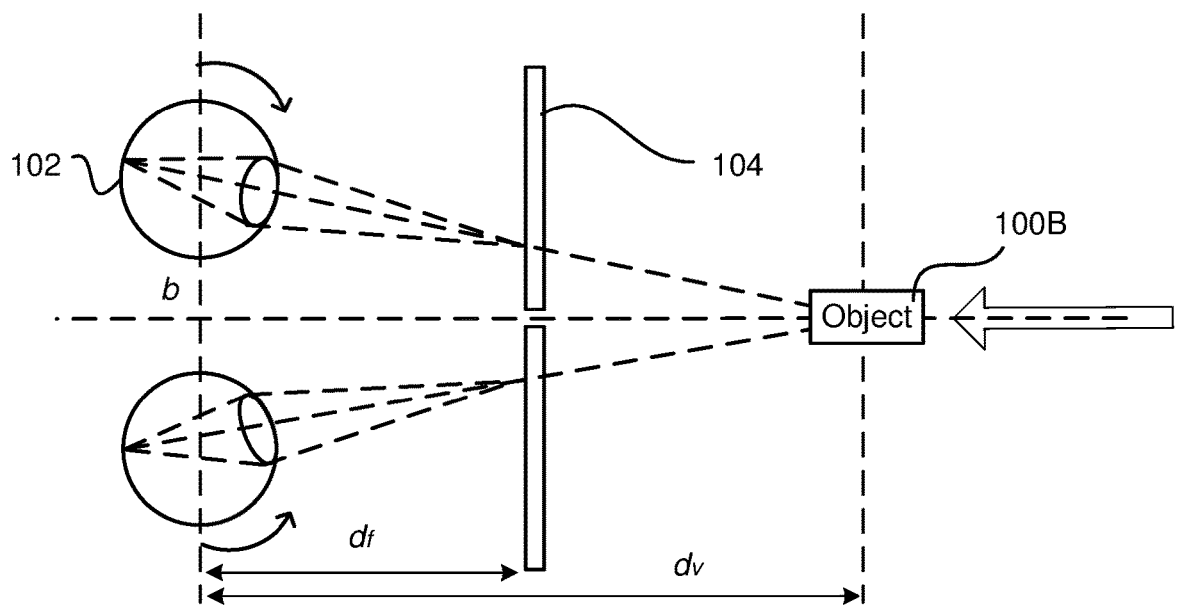
FIG. 1B shows an example conflict between vergence and accommodation that can occur with some three-dimensional displays, according to one embodiment.

FIG. 1B shows an example conflict between vergence and accommodation that can occur with some three-dimensional (3D) electronic displays. In this example, a user is looking at a virtual object 100B displayed on an electronic screen 104; however, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but there is no increased focusing power or reduced focal length of each eye; hence, the user's eyes do not accommodate as in FIG. 1A. Thus, instead of increasing focusing power or reducing focal length to accommodate for the closer vergence depth, each eye 102 maintains accommodation at a distance associated with the electronic display 104. Thus, the vergence depth ($d_v$) often does not equal the focal point ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2A:
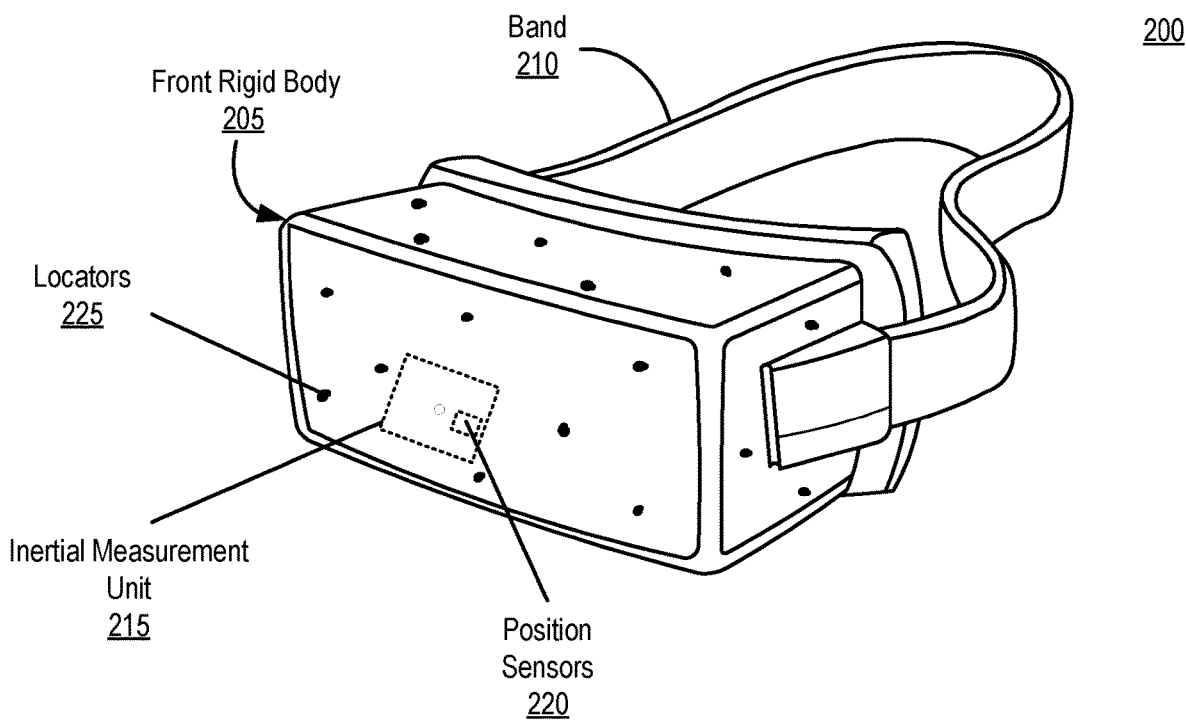
FIG. 2A is a wire diagram of a head mounted display (HMD), according to one embodiment.

FIG. 2A is a wire diagram of a head mounted display (HMD) 200, according to one embodiment. The HMD 200 may be for use in a virtual reality (VR) system, an augmented reality (AR) system, a mixed reality (MR) system, or some combination thereof. The HMD 200 includes a front rigid body 205 and a band 210. In some embodiments, portions of the HMD 200 may be at least partially transparent (e.g., if the HMD 200 is part of an AR or MR system). For example, portions of the front side 206 and intervening components (e.g., electronic display) between the front side 206 and an eye of a user may be transparent. The front rigid body 205 includes one or more electronic display elements of an electronic display (not shown), an inertial measurement unit (IMU) 215, one or more position sensors 220, and locators 225. In the embodiment shown by FIG. 2A, the position sensors 220 are located within the IMU 215, and neither the IMU 215 nor the position sensors 220 are visible to the user.

Figure 2B:
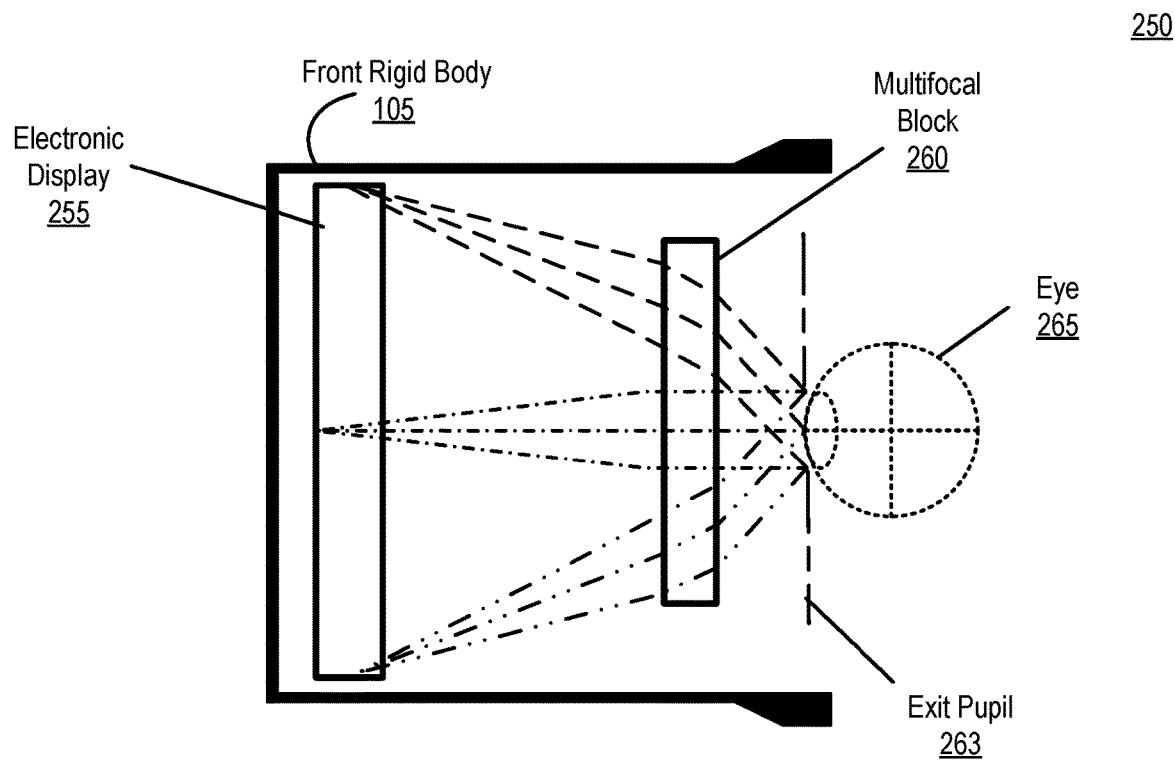
FIG. 2B is a cross section of a front rigid body of the HMD shown in FIG. 2A, according to one embodiment.

FIG. 2B is a cross section 250 of the front rigid body 205 of the embodiment of the HMD 200 shown in FIG. 2A. As shown in FIG. 2B, the front rigid body 205 includes an electronic display 255 and a multifocal block 260 that together provide image light to an exit pupil 263. The exit pupil 263 is the location of the front rigid body 205 where a user's eye 265 is positioned. For purposes of illustration, FIG. 2B shows a cross section 250 associated with a single eye 265, but another optics block, separate from the multifocal block 260, provides altered image light to another eye of the user.

The electronic display 255 displays images to the user. In various embodiments, the electronic display 255 may include a single electronic display or multiple electronic displays (e.g., a display for each eye of a user). Examples of the electronic display 255 include: a liquid crystal display (LCD), an organic light emitting diode (OLED) display, an active-matrix organic light-emitting diode display (AMOLED), a QOLED, a QLED, some other display, or some combination thereof.

The multifocal block 260 includes one or more multifocal structures (not shown). The one or more multifocal structures adjust an orientation of light emitted from the electronic display 255 such that it appears at particular focal distances from the user. Each multifocal structure includes one or more optical components such as, for example, lens, a mirror, a polarizer, a passive waveplate (e.g., half waveplate, quarter waveplate), a switchable waveplate (e.g., SHWP), a beam splitter (e.g., 50:50 beam splitter), a beam splitting polarizer (e.g., reflective linear polarizer or wire grid polarizer), a polarization rotator (e.g., a Faraday rotator), or any other suitable optical component that affects the image light emitted from the electronic display 255. Moreover, a multifocal structure may include combinations of different optical components. In some embodiments, one or more of the optical components in a multifocal structure may have one or more coatings, such as anti-reflective coatings.

The one or more multifocal structures adjust the focal distance by adjusting the length of the optical path of light (path length) emitted from the electronic display 255. Each focal distance corresponds to a respective focal plane, and each focal plane is associated with a respective path length of image light that propagates from the electronic display 255 to the exit pupil 263. Each multifocal structure varies the path length of the image light, and thus the focal planes, by varying a number of reflections the image light undergoes in the multifocal block 260. A larger number of reflections increases the path length and, accordingly, presents a focal plane further away from the user. Likewise, a smaller number of reflections decrease the path length and, accordingly, presents a focal plane close to the user. The location of the focal planes also depends on focal lengths of the optical components within the optical path. In some configurations, multifocal structures can be cascaded (e.g., in series) to increase a number of possible focal planes. For example a first multifocal structure and a second multifocal structure, in isolation, have two possible focal planes, however, when placed in optical series, the resulting cascaded multifocal structure of the multifocal block has 4 possible focal planes.

The one or more multifocal blocks vary the path length by switching a state of one or more of the electrically switchable half waveplates (SHWP) of the one or more multifocal blocks. The switching state of a SHWP is either active or non-active. When active, the SHWP rotates linearly polarized light 90 degrees, and when non-active, the SHWP transmits linear polarized light without affecting the polarization of the light. Some embodiments of the multifocal structures of the multifocal block 260 are discussed below with regards to FIGS. 3A-8B.

Additionally, in some embodiments, the multifocal block 260 magnifies received light, corrects optical errors (e.g., field curvature, chromatic aberration, etc.) associated with the image light, and presents the corrected image light to a user of the HMD 200.

FIG. 3A illustrates a multifocal structure 300, according to one embodiment. The multifocal structure 300 is an embodiment of a multifocal structure within the multifocal block 260. As illustrated, the multifocal structure 300 includes optical components including polarizers 302 and 312, quarter waveplates 304 and 308 (hereinafter collectively referred to as "QWPs 304 and 308"), an optical element 306, and a SHWP 310. Image light from the electronic display 255 propagates along a z-axis in a Cartesian coordinate system toward the exit pupil 263 of the multifocal structure 300. In some embodiments, the multifocal structure 300 has rotational symmetry along the z-axis. In alternate embodiments, the multifocal structure 300 is not rotationally symmetric (e.g., symmetric in x, but not in y).

Although illustrated as being flat and separate elements, the optical elements (e.g., the polarizers 302 and 312, the QWPs 304 and 308, and the optical element 306) may be coatings on optical surfaces that are curved to add optical power to a system (e.g., a system including the front rigid body 105 including the electronic display 255 and the multifocal block 260).

The arrangement of the optical elements of the multifocal structure 300 of FIG. 3A includes the polarizer 302, the QWP 304, the optical element 306, the QWP 308, the SHWP 310, and the polarizer 312. In alternate embodiments, the optical elements of the optics block 118 may be arranged in other configurations. For example, the SHWP 310 and the QWP 308 may be interchanged (e.g., as illustrated in FIGS. 7A and 7B).

The polarizers 302 and 312 are polarizers that linearly polarize light in accordance with its associated axis orientation. The polarizers 302 and 312 may be, for example, an absorptive polarizer, a reflective polarizer, a linear polarizing beam splitter, or some other optical element that linearly polarizes light. A reflective polarizer polarizes light in accordance with its associated axis orientation. For example, a polarizer passes incident light whose electric field component is aligned with an axis orientation of the reflective polarizer, and reflects light whose electric field component is orthogonal to the axis orientation of the reflective polarizer. A linear polarizing beam splitter splits light into two beams whose respective electric field components are linearly polarized. In some embodiments, one of the beams output from the linear polarizing beam splitter is blocked (e.g., via baffles, some type of light absorptive mechanism, etc.).

The QWPs 304 and 308 convert incident linearly polarized light into circularly polarized light, and vice versa. The QWPs 304 and 308 have an axis 45° (or 90°) relative to the direction of the axis orientation of the polarizer 302. The orientation of a waveplate axis relative to the axis orientation incident linearly polarized light controls the handedness of the emitted circularly polarized light. Similarly, the handedness of incident circularly polarized light controls orientation of linearly polarized light output by the QWPs 304 and 308.

In embodiments where the optical element 306 is a partially reflective mirror, the optical element 306 is a 50:50 reflective element. In the embodiments described above, it may transmit a portion of incident light and reflect a portion of incident light. For example, in these embodiments, the optical element 306 may reflect 50% of incident light and transmit the remaining 50% of incident light. A partially reflective mirror always transmits some percentage of incident light and reflects the remaining percentage of incident light regardless of polarization. In other embodiments, the 50:50 mirror is a polarization rotator capable of enabling 100% transmission. Polarization rotators are further described below in conjunction with FIG. 3B. The SHWP 310 passes incident light, and, if in an active state, rotates a polarization of light propagating through the SHWP 310 by 90°. The SHWP 310 has at least two states: an "inactive" state and an "active" state. In the inactive state, the SHWP 310 does not affect polarization of light passing through it. In the active state, the SHWP 310 rotates the polarization of the light passing through the SHWP 310 by 90°. How different states of the SHWP 210 affect path length is described in detail below with regard to, for example, FIGS. 4A to 8B.

FIG. 3B illustrates a multifocal structure 350, according to another embodiment. As illustrated, the multifocal structure 350 includes optical elements including the polarizers 302 and 312, the SHWP 310, and a polarization rotator 314. The polarization rotator 314 receives first linearly polarized light, rotates the first linearly polarized light, and passes a second linearly polarized light. A direction of polarization of the second linearly polarized light is independent of a propagation direction of the first linearly polarized light. The polarization rotator 314 has an associated axis orientation which determines an amount the first linearly polarized light is rotated. In one example, the polarization rotator 314 operates the same as a Faraday rotator.

In the configurations illustrated in FIGS. 3A and 3B, the SHWP 310 may be in the inactive state or in the active state. When the SHWP 310 is in the inactive state, the light in the multifocal structure 300/350 undergoes at least two reflections before exiting the multifocal structure 300/350 towards the exit pupil 263 and appears to the user of the HMD 200 to originate at a first focal plane located at a first distance from the HMD 200. When the SHWP 310 is in the active state, the light in the multifocal structure 300/350 appears to the user of the HMD 200 to originate at a second focal plane located at a second distance from the HMD 200 that is different from the first distance. Thus, the light appears to the user of the HMD 200 to originate at different focal planes depending on the state of the SHWP 310.

Example Configurations

FIG. 4A illustrates a first optical path in a multifocal structure 400, according to one embodiment. The multifocal structure 400 is an embodiment of the multifocal structure 300 of FIG. 3A. The multifocal structure 400 includes a polarizer 402, a QWP 404, a 50:50 reflective element 406, a QWP 408, a SHWP 410 in an active state, and a polarizer 412.

Orientation blocks are illustrated between each of the optical elements. The orientation blocks illustrate an orientation of light between each of the optical elements. The orientation is illustrated with respect to x/y coordinates (with reference to an orientation coordinate circle illustrated at a left hand side of the figure).

The polarizer 402 is an embodiment of the polarizer 302 having a transmission axis orientation of 90° and a reflection axis orientation of 0°. In this instance, the polarizer 402 is a linear polarizing beam splitter. The polarizer 402 polarizes image light 422 to generate linearly polarized light 424 having an orientation whose electronic component is oriented along the y axis (i.e., has an orientation of 90°).

The QWP 404 is an embodiment of the QWP 304 having an axis orientation of 45°. The QWP 404 converts the linearly polarized light 424 into circularly polarized light 426. The circularly polarized light 426 is left-hand circularly polarized propagating in +z direction.

The 50:50 reflective element 406 is an embodiment of the optical element 306. The 50:50 reflective element 406 reflects 50% of the circularly polarized light 426 and transmits 50% of the circularly polarized light 426 as circularly polarized light 428 which is also left-hand circularly polarized propagating in the +z direction. The reflected light is right-hand circularly polarized propagating in the −z direction towards the QWP 404. The QWP 404 converts the right-hand circularly polarized light into linearly polarized light with an orientation of 180° and propagates in the −z direction toward the polarizer 402. In the example embodiment depicted in FIG. 4A, the reflected light is extinguished at the polarizer 402.

The QWP 408 is an embodiment of the QWP 308 having an axis orientation of 135°. The QWP 408 converts the circularly polarized light 428 into linearly polarized light 430 having an orientation whose electronic component is oriented along the y axis (i.e., has an orientation of 90°).

As the SHWP 410 is in the active state, the SHPW 410 rotates the polarization of the linearly polarized light 430 by 90° and outputs a modified linearly polarized light 432 having an orientation whose electronic component is oriented along the x axis (i.e., has an orientation of 0°).

The polarizer 412 is an embodiment of the polarizer 312 having an axis orientation of 0°, and in this instance is a linear polarizer. The polarizer 412 receives the modified linearly polarized light 432 and transmits it as polarized light 434 because the axis orientation of the polarizer 412 is aligned with the orientation of the electronic component of the modified linearly polarized light 432.

FIG. 4B illustrates a second optical path in the multifocal structure 400, according to one embodiment. In this embodiment, the SHWP 410 is in an inactive state.

The polarizer 402 polarizes the image light 422 to generate linearly polarized light 424 having an orientation whose electronic component is oriented along the y axis (i.e., has an orientation of 90°).

The QWP 404 converts the linearly polarized light 424 into circularly polarized light 426. The circularly polarized light 426 is left-hand circularly polarized propagating in the +z direction.

The 50:50 reflective element 406 reflects 50% of the circularly polarized light 426 as reflected circularly polarized light 438 and transmits 50% of the circularly polarized light 426 as circularly polarized light 428. The reflected circularly polarized light 438 is right-hand circularly polarized propagating in the −z direction. The circularly polarized light 428 is left-hand circularly polarized propagating in the +z direction.

Following the path of the circularly polarized light 428, the QWP 408 converts the circularly polarized light 428 into linearly polarized light 430 having an orientation whose electronic component is oriented along the y axis (i.e., has an orientation of 90°).

As the SHWP 410 is in the inactive state, the SHWP 410 does not affect the polarization of the linearly polarized light 430. The SHWP 410 outputs linearly polarized light 436 having an orientation whose electronic component is oriented along the y axis (i.e., has an orientation of 90°).

The polarizer 412 blocks the linearly polarized light 436, because the axis orientation the polarizer 412 is orthogonal to the orientation of the electronic component of the linearly polarized light 436.

Following the path of the reflected circularly polarized light 438, the QWP 404 converts the reflected circularly polarized light 438 into linearly polarized light 440 having an orientation whose electronic component is oriented along the x axis (i.e., has an orientation of 0°).

The polarizer 402 reflects the linearly polarized light 440 to generate reflected linearly polarized light 442 having an orientation whose electronic component is oriented along the x axis (i.e., has an orientation of 0°). The polarizer 402 reflects the linearly polarized light 440 because the electronic component of the linearly polarized light 440 is orthogonal to the polarization axis of the polarizer 402.

The QWP 404 converts the reflected linearly polarized light 442 into circularly polarized light 444. The circularly polarized light 444 is right-hand circularly polarized propagating in the +z direction.

The 50:50 reflective element 406 reflects 50% of the circularly polarized light 444 and transmits 50% of the circularly polarized light 444 as circularly polarized light 446. The circularly polarized light 446 is right-hand circularly polarized propagating in the +z direction towards QWP 408. The light reflected by the 50:50 reflective element 406 is left-hand circularly polarized and propagates in the −z direction towards the QWP 404. The QWP 404 converts the left-hand circularly polarized into linearly polarized light having an orientation whose electronic component is oriented along the x axis (i.e., has an orientation of 90°) propagating in the −z direction towards the polarizer 402. The converted linearly polarized light passes through the polarizer 402 propagating in the −z direction. In one or more embodiments the multifocal structure 400 depicted in FIG. 4B additionally contains a backstop (not shown) configured to absorb one or more wavelengths of electromagnetic radiation with no reflection. The backstop may be situated behind the polarizer and all light passing through the polarizer in the −z direction is absorbed by the backstop (not shown).

The QWP 408 converts the circularly polarized light 446 into linearly polarized light 448 having an orientation whose electronic component is oriented along the x axis (i.e., has an orientation of 0°).

The SHWP 410 is in its inactive state and does not affect the polarization of the linearly polarized light 448. The SHWP 410 outputs linearly polarized light 450 having an orientation whose electronic component is oriented along the x axis (i.e., has an orientation of positive of 0°).

The polarizer 412 receives the linearly polarized light 450 and transmits it as polarized light 452 because the axis orientation of the polarizer 412 is aligned with the orientation of the electronic component of the linearly polarized light 450.

The optical paths for FIGS. 4A and 4B are different. The SHWP 410 may be in an active state (as illustrated in FIG. 4A) or in an inactive state (as illustrated in FIG. 4B). When the SHWP 410 is in the inactive state, the image light 422 undergoes two reflections before exiting the multifocal structure 400 towards the exit pupil and appears to a user to originate at a first focal plane located at a first distance. When the SHWP 410 is in the active state, the image light 422 appears to the user to originate at a second focal plane located at a second distance that is different from the first distance. Thus, the image light 422 appears to the user to originate at the first focal plane when the SHWP 410 is in the inactive state and at the second focal plane when the SHWP 410 is in the active state.

FIG. 5A illustrates a first optical path in a multifocal structure 500, according to one embodiment. The multifocal structure 500 is an embodiment of the multifocal structure 300 of FIG. 3A. The multifocal structure 500 includes a polarizer 502, a QWP 504, a 50:50 reflective element 506, a QWP 508, a SHWP 510 in an active state, and a polarizer 512.

The polarizer 502 is an embodiment of the polarizer 302 having an axis orientation of 45°, and in this instance is a linear polarizer. The polarizer 502 polarizes image light 522 to generate linearly polarized light 524 having an orientation whose electronic component has an orientation of positive 45° (in the x-y plane—where an orientation aligned with positive y would correspond to 90 degrees).

The QWP 504 is an embodiment of the QWP 304 having an axis orientation of 0°. The QWP 504 converts the linearly polarized light 524 into circularly polarized light 526. The circularly polarized light 526 is left-hand circularly polarized propagating in the +z direction.

The 50:50 reflective element 506 reflects 50% of the circularly polarized light 526 and transmits 50% of the circularly polarized light 526 as circularly polarized light 528. The circularly polarized light 528 is left-hand circularly polarized and propagates toward the QWP 508 in the +z direction. On the other hand, the reflected light is right-hand circularly polarized and propagates toward the QWP 504 in the −z direction. The reflected light then passes through the QWP 504 and is converted into linearly polarized light with an orientation of 135° propagating in the −z direction towards polarizer 502. Upon encountering the polarizer 502, the light reflected from the 50:50 reflective element 506 is extinguished.

The QWP 508 is an embodiment of the QWP 308 having an axis orientation of 0°. The QWP 508 converts the circularly polarized light 528 into linearly polarized light 530 having an orientation whose electronic component has an orientation of positive 135° (in the x-y plane).

As the SHWP 510 is in the active state, the SHWP 510 rotates the linearly polarized light 530 and outputs a modified linearly polarized light 532 having an orientation whose electronic component has an orientation of positive 45° (in the x-y plane).

The polarizer 512 is an embodiment of the polarizer 312 having a transmission axis orientation of 45° and a reflection axis orientation of 135°. In this instance, the polarizer 512 is a linear polarizing beam splitter. The polarizer 512 receives the modified linearly polarized light 532 and transmits it as polarized light 534 because the axis orientation of the polarizer 512 is aligned with the orientation of the electronic component of the modified linearly polarized light 532.

FIG. 5B illustrates a second optical path in the multifocal structure 500, according to one embodiment. In this embodiment, the SHWP 510 is in an inactive state.

The polarizer 502 polarizes the image light 522 to generate linearly polarized light 524 having an orientation whose electronic component has an orientation of positive 45° (in the x-y plane).

The QWP 504 converts the linearly polarized light 524 into circularly polarized light 526. The circularly polarized light 526 is left-hand circularly polarized propagating in the +z direction.

The 50:50 reflective element 506 reflects 50% of the circularly polarized light 526 and transmits 50% of the circularly polarized light 526 as circularly polarized light 528. The transmitted circularly polarized light 526 is left-hand circularly polarized and in the +z direction towards the QWP 508. The reflected light is right-hand circularly polarized and propagates in the −z direction towards QWP 504. Upon passing through the QWP 504 in the −z direction, the reflected light is converted into linearly polarized light with an orientation of 135° propagating in the −z direction towards polarizer 502 where it is extinguished.

The QWP 508 converts the circularly polarized light 528 into linearly polarized light 530 having an orientation whose electronic component has an orientation of positive 135° (in the x-y plane).

As the SHWP 510 is in the inactive state, the SHWP 510 does not affect the polarization of the linearly polarized light 530. The SHWP 510 outputs linearly polarized light 536 having an orientation whose electronic component has an orientation of positive 135° (in the x-y plane).

The polarizer 512 reflects the linearly polarized light 536, because the transmission axis orientation of the polarizer 512 is orthogonal to the orientation of the electronic component of the linearly polarized light 536. The polarizer 512 reflects the linear polarized light 536 as linearly polarized light 538 having an orientation whose electronic component has an orientation of negative 45° (in the x-y plane).

The SHWP 510 is in its inactive state and does not affect the polarization of the reflected linearly polarized light 538. The SHWP 510 outputs reflected linearly polarized light 540 having an orientation whose electronic component has an orientation of 45° (in the x-y plane) propagating in the −z direction.

The QWP 508 converts the reflected linearly polarized light 540 into circularly polarized light 542. The circularly polarized light 542 is left-hand circularly polarized propagating in the −z direction.

The 50:50 reflective element 506 reflects 50% of the circularly polarized light 542 as reflected circularly polarized light 544 and transmits 50% of the circularly polarized light 542. The reflected circularly polarized light 544 is right-hand circularly polarized propagating in the +z direction. The transmitted light passes through QWP 504 and is converted into linearly polarized light with an orientation of 135° propagating in the −z direction towards polarizer 502. Upon reaching the polarizer 502, the linearly polarized light is extinguished.

The QWP 508 converts the reflected circularly polarized light 544 into linearly polarized light 546 having an orientation whose electronic component has an orientation of positive 45° (in the x-y plane).

The SHWP 510 is in its inactive state and does not affect the polarization of the linearly polarized light 546. The SHWP 510 outputs linearly polarized light 548 having an orientation whose electronic component has an orientation of positive 45° (in the x-y plane).

The polarizer 512 receives the linearly polarized light 548 and transmits it as polarized light 550 because the axis orientation of the polarizer 512 is aligned with the orientation of the electronic component of the linearly polarized light 548.

FIG. 6A illustrates a first optical path in a multifocal structure 600, according to one embodiment. The multifocal structure 600 is an embodiment of the multifocal structure 300 of FIG. 3B. The multifocal structure 600 includes a polarizer 602, a SHWP 610 in an active state, a polarization rotator 614, and a polarizer 612.

The polarizer 602 is an embodiment of the polarizer 302 having a transmission axis orientation of 135°, and in this instance is a linear polarizing beam splitter. The linear polarizing beam splitter 602 polarizes image light 622 to generate linearly polarized light 624 having an orientation whose electronic component has an orientation of 315° (in the x-y plane) propagating in the +z direction.

The SHWP 610 is an embodiment of the SHWP 310. As the SHWP 610 is in an active state, the SHWP 610 rotates the linearly polarized light 624 and outputs modified linearly polarized light 626 having an orientation whose electronic component has an orientation of 45° (in the x-y plane) propagating in the +z direction.

The polarization rotator 614 is an embodiment of the polarization rotator 314. The polarization rotator 614 rotates the modified linearly polarized light 626 to generate rotated linearly polarized light 628 having an orientation whose electronic component is oriented along the x axis (i.e., has an orientation of 0°) propagating in the +z direction.

The polarizer 612 is an embodiment of the polarizer 312 having an axis orientation of 0°, and in this instance is a linear polarizing beam splitter. The linear polarizing beam splitter 612 receives the rotated linearly polarized light 628 and transmits it as polarized light 630 because the axis orientation of the linear polarizing beam splitter 612 is aligned with the orientation of the electronic component of the rotated linearly polarized light 628.

FIG. 6B illustrates a second optical path in the multifocal structure 600, according to one embodiment. In this embodiment, the SHWP 610 is in an inactive state.

The linear polarizing beam splitter 602 polarizes the image light 622 to generate linearly polarized light 624 having an orientation whose electronic component has an orientation of 315° (in the x-y plane) propagating in the +z direction.

As the SHWP 610 is in the inactive state, the SHWP 610 does not affect the polarization of the linearly polarized light 624. The SHWP 610 outputs linearly polarized light 632 having an orientation whose electronic component has an orientation of 315° (in the x-y plane) propagating in the +z direction.

The polarization rotator 614 rotates the linearly polarized light 632 to generate rotated linearly polarized light 634 having an orientation whose electronic component is oriented along the negative y axis (i.e., has an orientation of 270°) propagating in the +z direction.

The polarizer 612 reflects the linearly polarized light 634 because the axis orientation of the linear polarizing beam splitter 612 is orthogonal to the orientation of the electronic component of the rotated linearly polarized light 634. The linear polarizing beam splitter 612 reflects reflected linearly polarized light 636 having an orientation whose electronic component is oriented along the positive y axis (i.e., has an orientation of 90°) propagating in the −z direction.

The polarization rotator 614 rotates the reflected linearly polarized light 636 to generate rotated linearly polarized light 638 having an orientation whose electronic component has an orientation of 45° (in the x-y plane) propagating in the −z direction.

The SHWP 610 is in its inactive state and does not affect the polarization of the rotated linearly polarized light 638. The SHWP 610 outputs linearly polarized light 640 having an orientation whose electronic component has an orientation of 45° (in the x-y plane) propagating in the −z direction.

The linear polarizing beam splitter 602 reflects the linearly polarized light 640 to generate reflected linearly polarized light 642 having an orientation whose electronic component has an orientation of 225° (in the x-y plane) propagating in the +z direction.

The SHWP 610 is in its inactive state and does not affect the polarization of the reflected linearly polarized light 642. The SHWP 610 outputs linearly polarized light 644 having an orientation whose electronic component has an orientation of 225° (in the x-y plane) propagating in the +z direction.

The polarization rotator 614 rotates the linearly polarized light 644 to generate rotated linearly polarized light 646 having an orientation whose electronic component is oriented along the negative x axis (i.e., has an orientation of 180°) propagating in the +z direction.

The linear polarizing beam splitter 612 receives the rotated linearly polarized light 646 and transmits polarized light 648 because the axis orientation of the linear polarizing beam splitter 612 is aligned with the orientation of the electronic component of the rotated linearly polarized light 646. While the configurations described in conjunction with FIGS. 4A-5B may lose up to 50% of the image light passing through the optical element 306 (e.g., 50:50 reflective element), the configuration depicted FIG. 6A-B has the advantage of zero light loss.

Figure 7:
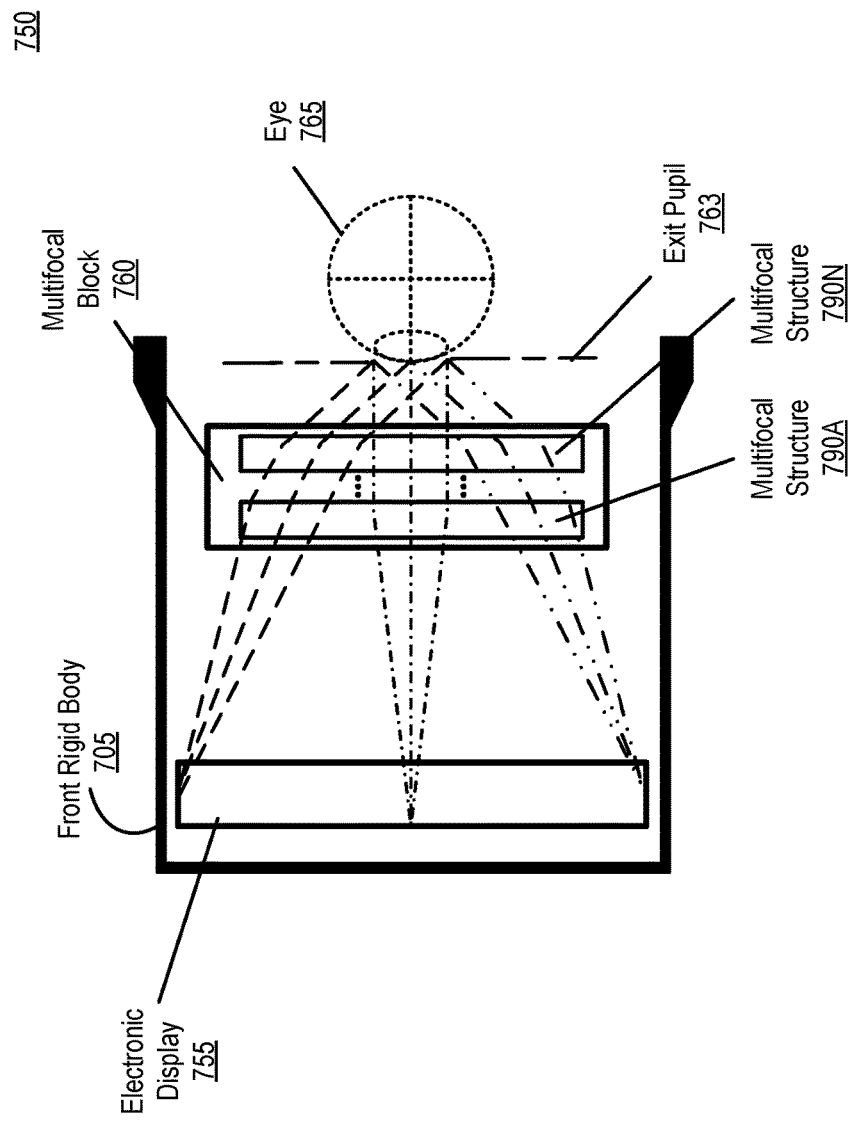
FIG. 7 is a cross section of a front rigid body of the HMD shown in FIG. 2A, according to another embodiment.

FIG. 7 is a cross section 750 of a front rigid body 705 of an embodiment of the HMD 200 shown in FIG. 2A. As shown in FIG. 9, the front rigid body 705 includes an electronic display 755 and a multifocal block 760 that together provide image light to an exit pupil 763. The exit pupil 763 is the location of the front rigid body 705 where a user's eye 765 is positioned. As illustrated, the multifocal block 760 includes multifocal structures 790A through 790N cascaded in series. The multifocal structures 790A-790N may be configured to present image light from the electronic display 755 at one of a plurality of focal planes. The HMD 200 selects a particular focal plane by placing the SHWP in each of the multifocal structures 790A though 790N in a particular state (e.g., active or inactive). In this manner, the HMD 200 adjusts an orientation of light emitted from the electronic display 755 such that it appears at a particular focal distances from the user. Each of the multifocal structures 790A though 790N may include any of the optical elements described above.

System Overview

Figure 8:
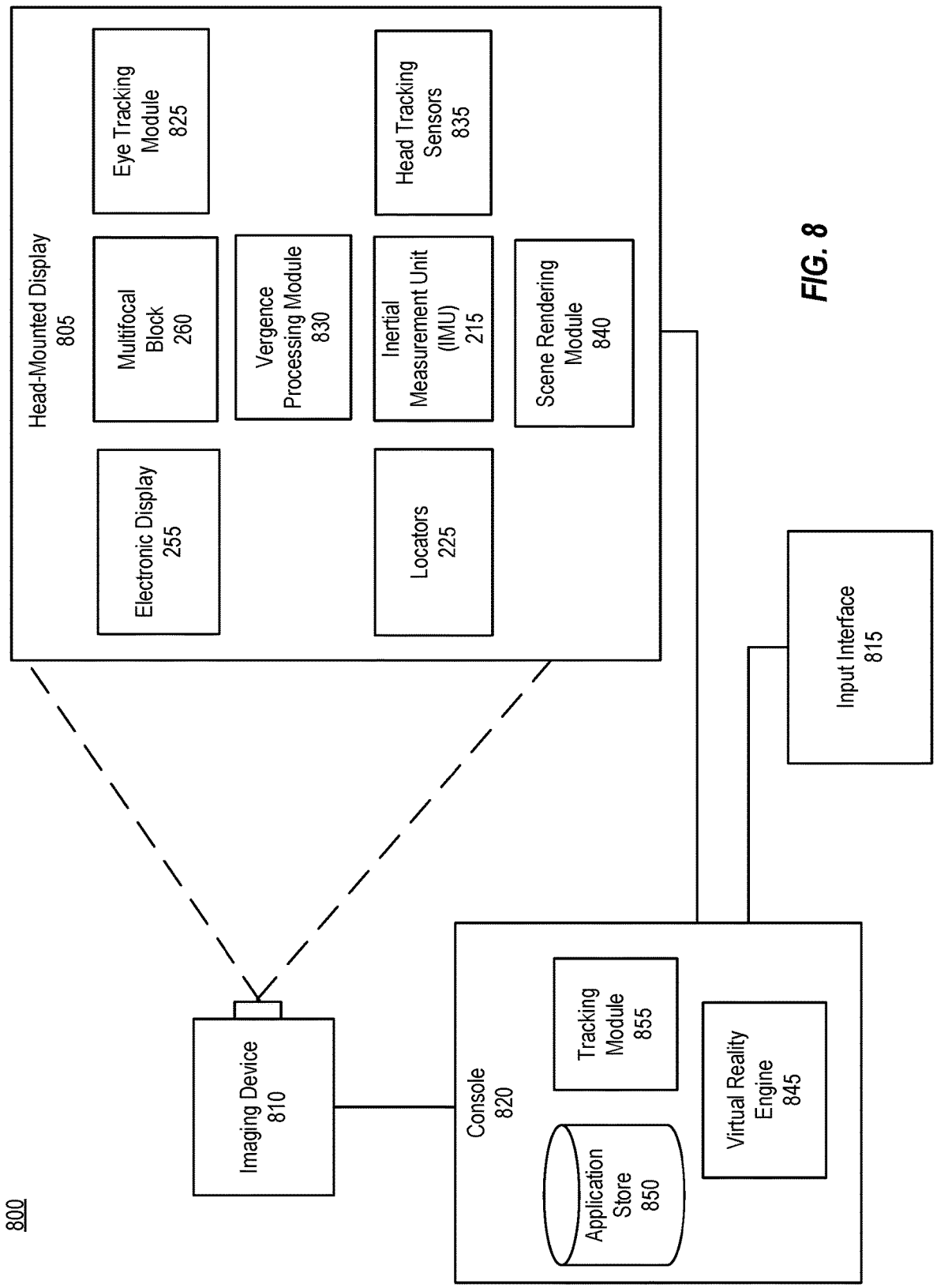
FIG. 8 is a block diagram of a multifocal system in which a HMD operates, according to one embodiment.

FIG. 8 is multifocal system 800 in which a HMD 805 operates. The multifocal system 800 may be for use as a virtual reality (VR) system, an augmented reality (AR) system, a mixed reality (MR) system, or some combination thereof. In this example, the multifocal system 800 includes a HMD 805, an imaging device 810, and an input interface 815, which are each coupled to a console 820. While FIG. 10 shows a single HMD 805, a single imaging device 810, and a single input interface 815, in other embodiments, any number of these components may be included in the system. For example, there may be multiple HMDs 805 each having an associated input interface 815 and being monitored by one or more imaging devices 810, with each HMD 805, input interface 815, and imaging devices 810 communicating with the console 820. In alternative configurations, different and/or additional components may also be included in the multifocal system 800. The HMD 805 may act as a VR, AR, and/or a MR HMD. An MR and/or AR HMD augments views of a physical, real-world environment with computer-generated elements (e.g., images, video, sound, etc.).

The HMD 805 presents content to a user. In some embodiments, the HMD 805 is an embodiment of the HMD 200 described above with reference to FIGS. 2A and 2B. Example content includes images, video, audio, or some combination thereof. Audio content may be presented via a separate device (e.g., speakers and/or headphones) external to the HMD 805 that receives audio information from the HMD 805, the console 820, or both. The HMD 805 includes an electronic display 255 (described above with reference to FIG. 2B), a multifocal block 260 (described above with reference to FIG. 2B), an eye tracking module 825, a vergence processing module 830, one or more locators 225, an internal measurement unit (IMU) 215, head tracking sensors 835, and a scene rendering module 840.

As noted above with reference to FIG. 2B-9, the multifocal block 260 activates and/or deactivates one or more SHWPs to adjust a focal length (adjusts optical power) of the multifocal block 260. The multifocal block 260 adjusts its focal length responsive to instructions from the console 820.

The eye tracking module 825 tracks an eye position and eye movement of a user of the HMD 805. A camera or other optical sensor inside the HMD 805 captures image information of a user's eyes, and eye tracking module 825 uses the captured information to determine interpupillary distance, interocular distance, a three-dimensional (3D) position of each eye relative to the HMD 805 (e.g., for distortion adjustment purposes), including a magnitude of torsion and rotation (i.e., roll, pitch, and yaw) and gaze directions for each eye. In one example, infrared light is emitted within the HMD 805 and reflected from each eye. The reflected light is received or detected by the camera and analyzed to extract eye rotation from changes in the infrared light reflected by each eye. Many methods for tracking the eyes of a user can be used by eye tracking module 825. Accordingly, the eye tracking module 825 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 825 integrates information from past measurements, measurements identifying a position of a user's head, and 3D information describing a scene presented by the electronic display 255. Thus, information for the position and orientation of the user's eyes is used to determine the gaze point in a virtual scene presented by the HMD 805 where the user is looking.

The vergence processing module 830 determines a vergence depth of a user's gaze based on the gaze point or an estimated intersection of the gaze lines determined by the eye tracking module 825. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 830 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 225 are objects located in specific positions on the HMD 805 relative to one another and relative to a specific reference point on the HMD 805. A locator 225 may be a light emitting diode (LED), a corner cube reflector, a reflective marker, a type of light source that contrasts with an environment in which the HMD 805 operates, or some combination thereof. Active locators 225 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 225 can be located beneath an outer surface of the HMD 805, which is transparent to the wavelengths of light emitted or reflected by the locators 225 or is thin enough not to substantially attenuate the wavelengths of light emitted or reflected by the locators 225. Further, the outer surface or other portions of the HMD 805 can be opaque in the visible band of wavelengths of light. Thus, the locators 225 may emit light in the IR band while under an outer surface of the HMD 805 that is transparent in the IR band but opaque in the visible band.

The IMU 215 is an electronic device that generates fast calibration data based on measurement signals received from one or more of the head tracking sensors 835, which generate one or more measurement signals in response to motion of HMD 805. Examples of the head tracking sensors 835 include accelerometers, gyroscopes, magnetometers, other sensors suitable for detecting motion, correcting error associated with the IMU 215, or some combination thereof. The head tracking sensors 835 may be located external to the IMU 215, internal to the IMU 215, or some combination thereof.

Based on the measurement signals from the head tracking sensors 835, the IMU 215 generates fast calibration data indicating an estimated position of the HMD 805 relative to an initial position of the HMD 805. For example, the head tracking sensors 835 include multiple accelerometers to measure translational motion (forward/back, up/down, left/right) and multiple gyroscopes to measure rotational motion (e.g., pitch, yaw, and roll). The IMU 215 can, for example, rapidly sample the measurement signals and calculate the estimated position of the HMD 805 from the sampled data. For example, the IMU 215 integrates measurement signals received from the accelerometers over time to estimate a velocity vector and integrates the velocity vector over time to determine an estimated position of a reference point on the HMD 805. The reference point is a point that may be used to describe the position of the HMD 805. While the reference point may generally be defined as a point in space, in various embodiments, a reference point is defined as a point within the HMD 805 (e.g., a center of the IMU 215). Alternatively, the IMU 215 provides the sampled measurement signals to the console 820, which determines the fast calibration data.

The IMU 215 can additionally receive one or more calibration parameters from the console 820. As further discussed below, the one or more calibration parameters are used to maintain tracking of the HMD 805. Based on a received calibration parameter, the IMU 215 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 840 receives content for the virtual scene from a VR engine 845 and provides the content for display on the electronic display 255. Additionally, the scene rendering module 840 can adjust the content based on information from the vergence processing module 830, the IMU 215, and the head tracking sensors 835. The scene rendering module 840 determines a portion of the content to be displayed on the electronic display 255 based on one or more of the tracking module 825, the head tracking sensors 835, or the IMU 215, as described further below.

The imaging device 810 generates slow calibration data in accordance with calibration parameters received from the console 820. Slow calibration data includes one or more images showing observed positions of the locators 225 that are detectable by imaging device 810. The imaging device 810 may include one or more cameras, one or more video cameras, other devices capable of capturing images including one or more locators 225, or some combination thereof. Additionally, the imaging device 810 may include one or more filters (e.g., for increasing signal to noise ratio). The imaging device 810 is configured to detect light emitted or reflected from the locators 225 in a field of view of the imaging device 810. In embodiments where the locators 225 include passive elements (e.g., a retroreflector), the imaging device 810 may include a light source that illuminates some or all of the locators 225, which retro-reflect the light towards the light source in the imaging device 810. Slow calibration data is communicated from the imaging device 810 to the console 820, and the imaging device 810 receives one or more calibration parameters from the console 820 to adjust one or more imaging parameters (e.g., focal length, focus, frame rate, ISO, sensor temperature, shutter speed, aperture, etc.).

The input interface 815 is a device that allows a user to send action requests to the console 820. An action request is a request to perform a particular action. For example, an action request may be to start or end an application or to perform a particular action within the application. The input interface 815 may include one or more input devices. Example input devices include a keyboard, a mouse, a game controller, or any other suitable device for receiving action requests and communicating the received action requests to the console 820. An action request received by the input interface 815 is communicated to the console 820, which performs an action corresponding to the action request. In some embodiments, the input interface 815 may provide haptic feedback to the user in accordance with instructions received from the console 820. For example, haptic feedback is provided by the input interface 815 when an action request is received, or the console 820 communicates instructions to the input interface 815 causing the input interface 815 to generate haptic feedback when the console 820 performs an action.

The console 820 provides content to the HMD 805 for presentation to the user in accordance with information received from the imaging device 810, the HMD 805, or the input interface 815. The console 820 includes an application store 850, a tracking module 855, and the VR engine 845. Some embodiments of the console 820 have different or additional modules. Similarly, the functions further described below may be distributed among components of the console 820 in a different manner than is described here.

The application store 850 stores one or more applications for execution by the console 820. An application is a group of instructions, that when executed by a processor, generates content for presentation to the user. Content generated by an application may be in response to inputs received from the user via movement of the HMD 805 or the input interface 815. Examples of applications include gaming applications, conferencing applications, video playback application, or other suitable applications.

The tracking module 855 calibrates the multifocal system 800 using one or more calibration parameters and may adjust one or more calibration parameters to reduce error in determining position of the HMD 805. For example, the tracking module 855 adjusts the focus of the imaging device 810 to obtain a more accurate position for observed locators 225 on the HMD 805. Moreover, calibration performed by the tracking module 855 also accounts for information received from the IMU 215. Additionally, if tracking of the HMD 805 is lost (e.g., imaging device 810 loses line of sight of at least a threshold number of locators 225), the tracking module 855 re-calibrates some or all of the multifocal system 800 components.

Additionally, the tracking module 855 tracks the movement of the HMD 805 using slow calibration information from the imaging device 810 and determines positions of a reference point on the HMD 805 using observed locators from the slow calibration information and a model of the HMD 805. The tracking module 855 also determines positions of the reference point on the HMD 805 using position information from the fast calibration information from the IMU 215 on the HMD 805. Additionally, the tracking module 855 may use portions of the fast calibration information, the slow calibration information, or some combination thereof, to predict a future location of the HMD 805, which is provided to the VR engine 845.

The VR engine 845 executes applications within the multifocal system 800 and receives position information, acceleration information, velocity information, predicted future positions, or some combination thereof for the HMD 805 from the tracking module 855. Based on the received information, the VR engine 845 determines content to provide to the HMD 805 for presentation to the user, such as a virtual scene, one or more virtual objects to overlay onto a real world scene, etc.

In some embodiments, the VR engine 845 maintains focal capability information of the multifocal block 260. Focal capability information is information that describes what focal distances are available to the multifocal block 260. Focal capability information may include, e.g., a range of focus the multifocal block 260 is able to accommodate (e.g., 0 to 4 diopters), a resolution of focus (e.g., 0.25 diopters), a number of focal planes, combinations of settings for SHWPs (e.g., active or non-active) that map to particular focal planes, or some combination thereof.

The VR engine 845 generates instructions for the multifocal block 260, the instructions causing the multifocal block 260 to adjust its focal distance to a particular location. The VR engine 845 generates the instructions based on focal capability information and, e.g. information from the vergence processing module 830, the IMU 215, and the head tracking sensors 835. The VR engine 845 uses the information from the vergence processing module 830, the IMU 215, and the head tracking sensors 835, or some combination thereof, to select an ideal focal plane to present content to the user. The VR engine 845 then uses the focal capability information to select a focal plane that is closest to the ideal focal plane. The VR engine 845 uses the focal information to determine settings for one or SHWPs within the multifocal block 260 that are associated with the selected focal plane. The VR engine 845 generates instructions based on the determined settings, and provides the instructions to the multifocal block 260.

Additionally, the VR engine 845 performs an action within an application executing on the console 820 in response to an action request received from the input interface 815 and provides feedback to the user that the action was performed. The provided feedback may be visual or audible feedback via the HMD 805 or haptic feedback via VR input interface 815.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A multifocal structure comprising:
    a plurality of optical components positioned in series such that light from a display is received and passes through each of the plurality of optical components at least once before being output from the multifocal structure, the plurality of optical components including:
        a switchable half waveplate (SHWP), the SHWP having a first state that causes the multifocal structure to output image light at a first focal distance, and a second state that causes the multifocal structure to output the image light at a second focal distance.

2. The multifocal structure of claim 1, wherein the first state causes a polarization change in the image light which results in at least one reflection of the image light occurring within the multifocal structure prior to exiting the multifocal structure.

3. The multifocal structure of claim 1, wherein the plurality of optical components further includes a reflective element positioned between an input of the multifocal structure and the SHWP, and the reflective element is configured to reflect 50 percent of incident image light and transmit a remaining 50 percent of the incident image light.

4. The multifocal structure of claim 1, wherein the plurality of optical components further includes a reflective polarizer positioned between an input of the multifocal structure and the SHWP.

5. The multifocal structure of claim 1, wherein the plurality of optical components further includes two quarter waveplates.

6. The multifocal structure of claim 1, wherein the plurality of optical components further includes a polarization rotator between the SHWP and an output of the multifocal structure, the polarization rotator configured to rotate a polarization of linearly polarized light.

7. The multifocal structure of claim 1, wherein the plurality of optical components further includes:
a first polarizer configured to linearly polarize light in accordance with a first axis orientation; and
a second polarizer located after the SHWP, the second polarizer configured to linearly polarize light in accordance with a second axis orientation.

8. The multifocal structure of claim 7, wherein the second axis orientation is orthogonal to the first axis orientation.

9. The multifocal structure of claim 7, wherein the second axis orientation is the same as the first axis orientation.

10. The multifocal structure of claim 1, wherein the multifocal structure is part of a head-mounted display (HMD).

11. The multifocal structure of claim 10, wherein the HMD includes an eye tracking system configured to determine eye tracking information for an eye of the user, and wherein the multifocal structure is further configured to output light at one of the first focal distance or the second focal distance based in part on the eye tracking information.

12. The HMD of claim 11, further comprising a second multifocal structure that is in optical series with the multifocal structure to form a cascaded multifocal structure that has at least 4 different focal distances.

13. A head-mounted display (HMD) comprising:
a display configured to emit image light; and
a multifocal structure that includes a plurality of optical components positioned in series such that image light from the display is received and passes through each of the plurality of optical components at least once before being output from the multifocal structure, the plurality of optical components including:
a switchable half waveplate (SHWP), the SHWP having a first state that causes the multifocal structure to output the image light at a first focal distance, and a second state that causes the multifocal structure to output the image light at a second focal distance.

14. The HMD of claim 13, wherein the first state causes a polarization change in the image light which results in at least one reflection of the image light occurring within the multifocal structure prior to exiting the multifocal structure.

15. The HMD of claim 13, wherein the plurality of optical components further includes a reflective element positioned between an input of the multifocal structure and the SHWP, and the reflective element is configured to reflect 50 percent of incident image light and transmit a remaining 50 percent of the incident image light.

16. The HMD of claim 13, wherein the plurality of optical components further includes a reflective polarizer positioned between an input of the multifocal structure and the SHWP.

17. The HMD of claim 13, wherein the plurality of optical components further includes:
a first polarizer configured to linearly polarize light in accordance with a first axis orientation; and
a second polarizer located after the SHWP, the second polarizer configured to linearly polarize light in accordance with a second axis orientation.

18. The HMD of claim 13, wherein the plurality of optical components further includes two quarter waveplates.

19. The HMD of claim 13, wherein the plurality of optical components further includes a polarization rotator between the SHWP and an output of the multifocal structure, the polarization rotator configured to rotate a polarization of linearly polarized light.

20. The HMD of claim 13, further comprising:
an eye tracking system configured to determine eye tracking information for an eye of the user; and
wherein the multifocal structure is further configured to output light at one of the first focal distance or the second focal distance based in part on the eye tracking information.

* * * * *